(12) United States Patent
Chuang

(10) Patent No.: US 6,269,547 B1
(45) Date of Patent: Aug. 7, 2001

(54) DIGITAL CABLE EXTENSION TRANSDUCER

(76) Inventor: Hsu-Chen Chuang, No. 11, Lane 200, Tung-Hwa St., Taipei (TW)

( * ) Notice: Subject to any disclaimer, the term of this patent is extended or adjusted under 35 U.S.C. 154(b) by 0 days.

(21) Appl. No.: 09/411,932

(22) Filed: Oct. 4, 1999

(51) Int. Cl.[7] .................................................. B65H 75/34
(52) U.S. Cl. ............................ 33/733; 33/1 PT; 254/338; 254/403
(58) Field of Search ........................... 33/733, 732, 1 PT, 33/755, 756, 772, 773, 393, 394; 254/338, 327, 403, 411, 413, 414, 272, 273; 242/417.3, 615.2, 397.5

(56) References Cited

U.S. PATENT DOCUMENTS

| | | | |
|---|---|---|---|
| 3,494,038 | * 2/1970 | Quenot | 33/769 |
| 3,638,220 | * 1/1972 | Malina et al. | 33/733 |
| 3,812,589 | * 5/1974 | Schultheis | 33/733 |
| 4,578,867 | * 4/1986 | Czerwinski et al. | 33/755 |
| 5,236,144 | * 8/1993 | Kautz | 242/371 |

* cited by examiner

Primary Examiner—Andrew H. Hirshfeld
(74) Attorney, Agent, or Firm—Connolly Bove Lodge & Hutz LLP

(57) ABSTRACT

The present invention provides a digital cable extension transducer, which is an integral structure of a spool, a spiral spring, a cable guide assembly and a magnet-detecting element for directly sending out a digital signal of a displacement of the monitored object. A circuit board is mounted on a bottom plate of the housing for further data transmission. With the pulleys in the cable guide assembly, the cable extends and winds orderly around the spool. A baffle is provided for shielding both the spool and three pulleys of the cable guide assembly, thereby, to prevent the extended cable derailing from the pulleys when the extended cable releases at high acceleration or loosens by accident.

4 Claims, 6 Drawing Sheets

DIGITAL CABLE EXTENSION TRANSDUCER

FIELD OF THE INVENTION

The present invention relates to a position-detecting device, particularly to a digital transducer for detecting, measuring and displaying a displacement.

BACKGROUND OF THE INVENTION

A dam, a canal or a pumping station is usually provided with a gate equipped with a gatage indicator for measuring the degree of gate opening or displacement of the top of the gate. The measured value is transmitted to a display panel in the control room, wherein water discharge is controlled under monitoring. For some gates, the gate opening is converted into flow rate data for proper operations. Accordingly, precision of actual displacement is very essential to gate operation.

However, a conventional gatage indicator usually uses a circular analog meter, which is driven by mechanical gears to simultaneously drive a potentiometer to directly convert the actual displacement detected into an analog signal according to a potentiometric ratio. Thereby measured values lack accuracy, such that, for example, the displayed data converted from the analog signal in the control room changes irregularly even if the gate is in a still state. Further advancement on the conventional detecting device is needed.

Therefore, the present inventor has disclosed a Taiwanese Utility Model Patent No. 140156 entitled "Cable extension type gatage transducer". The above mentioned shortcomings of the conventional measuring devices are improved. However, its disadvantages of higher production costs and larger occupied space should be further improved. Moreover, if an extended cable retracts at an irregular speed, the simply integrating of the drum and detecting roller will get the retracted cable disorderly winding on the drum to cause inaccurate displacement display. Besides, if extended but accidentally loosened, the cable will retract at high acceleration and release from the groove of the drum. As a result, both precision measurement and operation performance will be affected.

In addition, U.S. Pat. No. 5,236,144 "Cable Extension Linear Position Transducer" has disclosed that the displacement of an extended cable is detected by using a cable-driven drum to synchronously drive a potentiometer so that the detected displacement is directly converted into an analog signal according to potentiometric ratio. Nevertheless, no accessory is provided for guiding the extended cable to the orderly wound state when retracting at an irregular speed. Moreover, the lower accuracy occurs during the aforesaid signal conversion. In other designs, optical encoders which offer better precision are used, but these devices do not provide proper rolling up or, with the rolling wheel and the sensor wheel placed next to each other, take up a large volume. Moreover, the drawback that the breakdown easily occurs when the extended cable releases by accident or retracts at high acceleration should be improved.

In order to facilitate installation and to avoid breakdown, the present invention provides an integral structure comprising a spool, a spiral spring and a magnet-detecting element to secure greater reliability and accuracy on the actual displacement of the monitored object which is attached to the extension cable.

SUMMARY OF THE INVENTION

A digital cable extension transducer, according to one aspect of the invention, is an integral structure of a spool, a spiral spring, a magnet detecting element for sensing and directly sending out a digital signal and a cable guide assembly for guiding an extended cable orderly wound on the spool. The present invention comprises:

a housing, which comprises a side plate 20 for screwing with a base plate, a bottom plate mounted with a circuit board, a hole for a bushing provided at one side of the bottom plate and a cover integrally screwed to a front edge of the housing;

a spool, which is mounted on a shaft at the center of the base plate, wherein the shaft includes a catch. The spool comprises an outer flange and an inner flange, wherein the inner flange includes a plurality of magnets evenly spaced thereon. A socket of the flange includes a bearing, and a spiral spring is mounted between the inner flange of the spool and the catch of the shaft;

three pulleys, which are mounted on three individual cylinders surrounding the spool on the base plate to constitute a cable guide assembly, wherein the cable guide assembly guides the cable to extend or retract along grooves in the pulleys and assures orderly winding of the cable on the spool at its exact position to measure the precise displacement of the monitored object;

a baffle, which is an L-shaped plate for shielding both the spool and three pulleys and is integrally affixed to the base plate, comprises a front edge for fixing to the other ends of three individual cylinders by respective apertures thereof, wherein the distance between the inner wall of the baffle and the outer walls of the pulleys is smaller than the diameter of the cable to prevent the extended cable from derailing from the pulleys when releasing at high acceleration or loosening by accident.

The base plate further comprises a magnet detecting element sensing alternative pulse signals subject to the displacement of the magnets and dependent on the actual displacement of the monitored object attached to the cable and transmitting a digital signal to the circuit board.

The object of the present invention is to provide a digital cable extension transducer for measuring a displacement with more accuracy, which has an integral structure with improved retracting function and directly sends digital signals of the displacement of the monitored object. Accordingly, both operation performance and displacement precision are improved.

The present invention will be further understood with reference to the following description and accompanying drawings.

DETAILED DESCRIPTION OF THE PREFERRED EMBODIMENT

Figure 1:
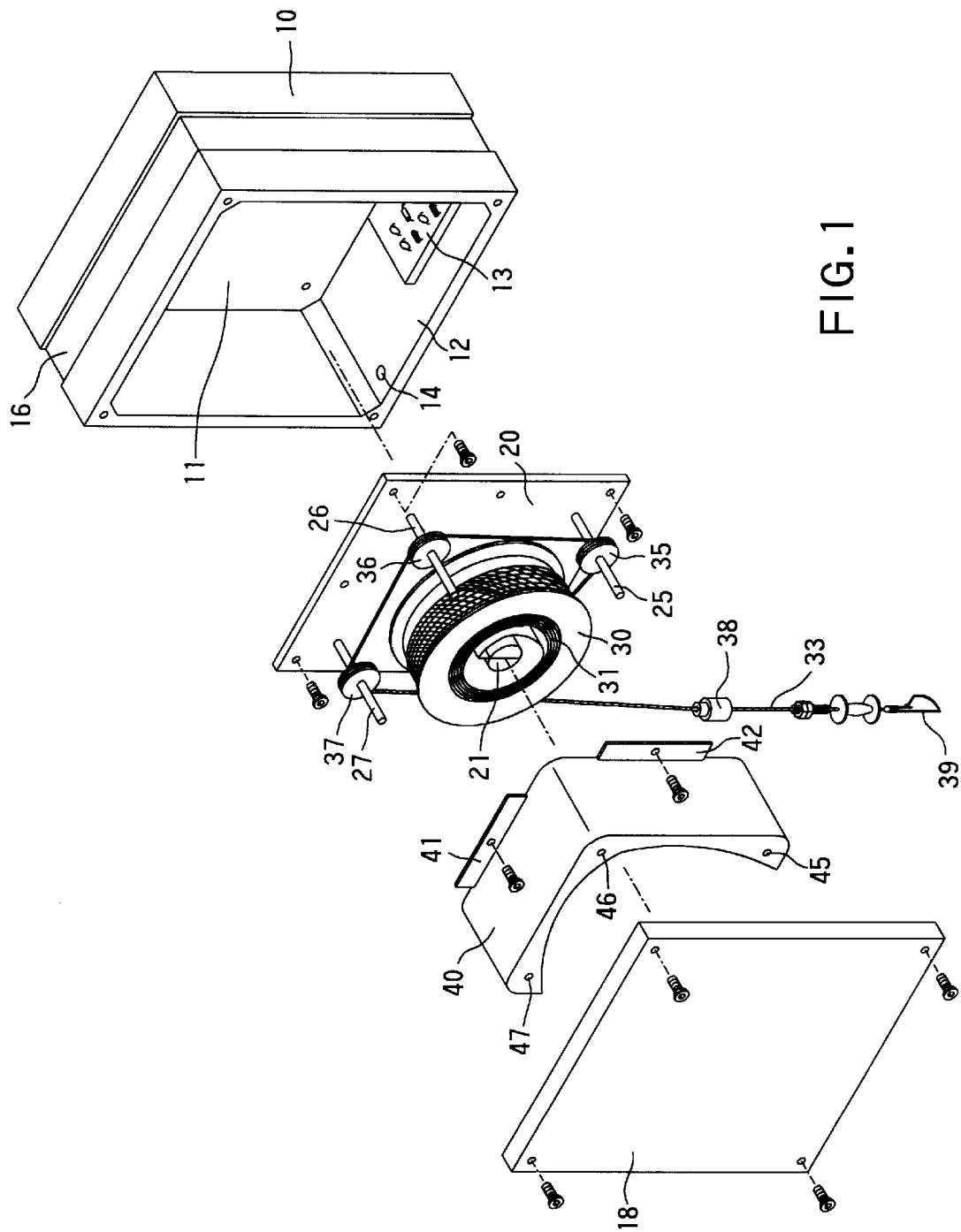
FIG. 1 is an exploded perspective view of a digital transducer of the present invention.
Figure 2:
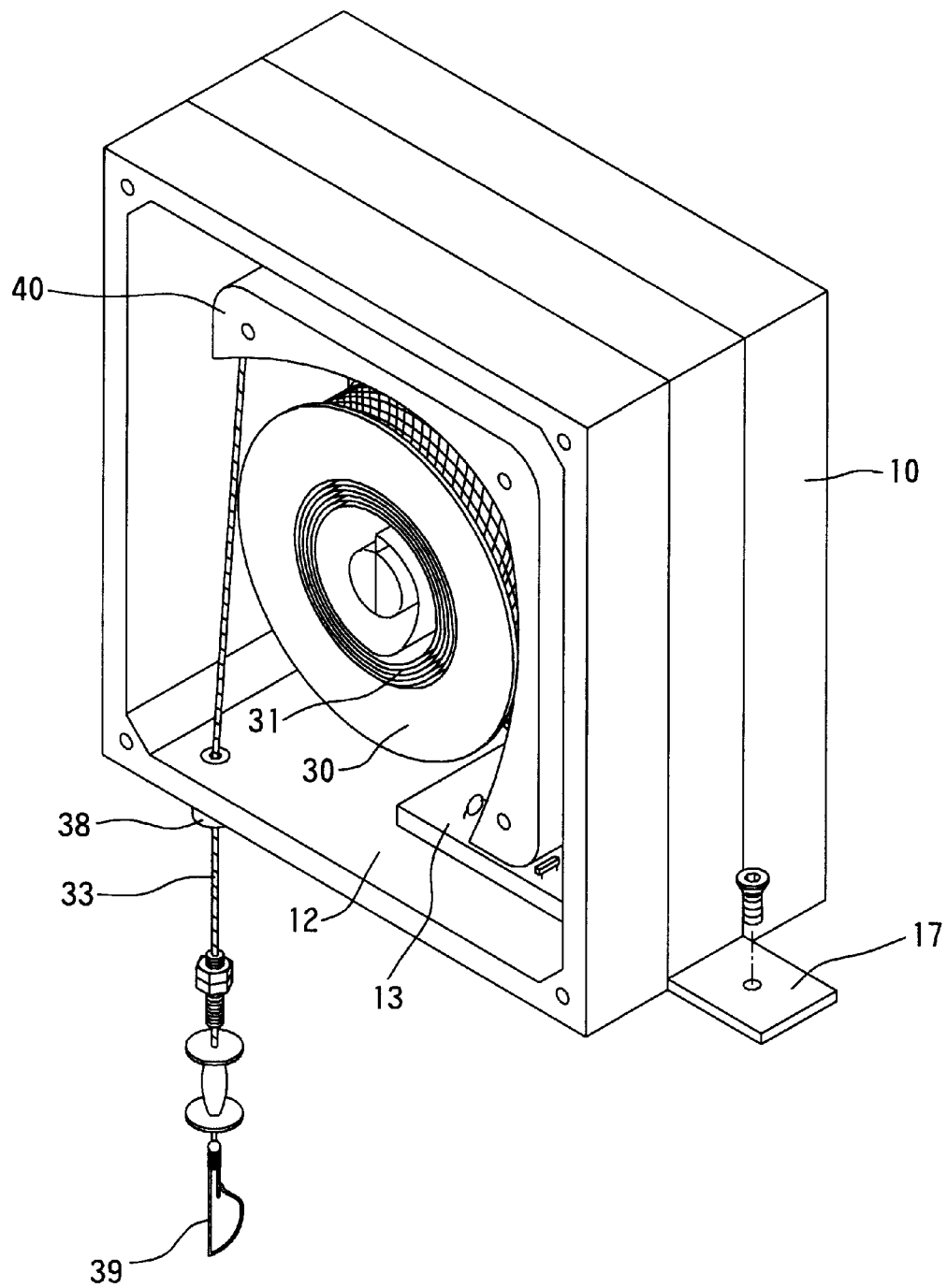
FIG. 2 is a perspective view of a digital transducer is of the present invention when assembled.
Figure 3:
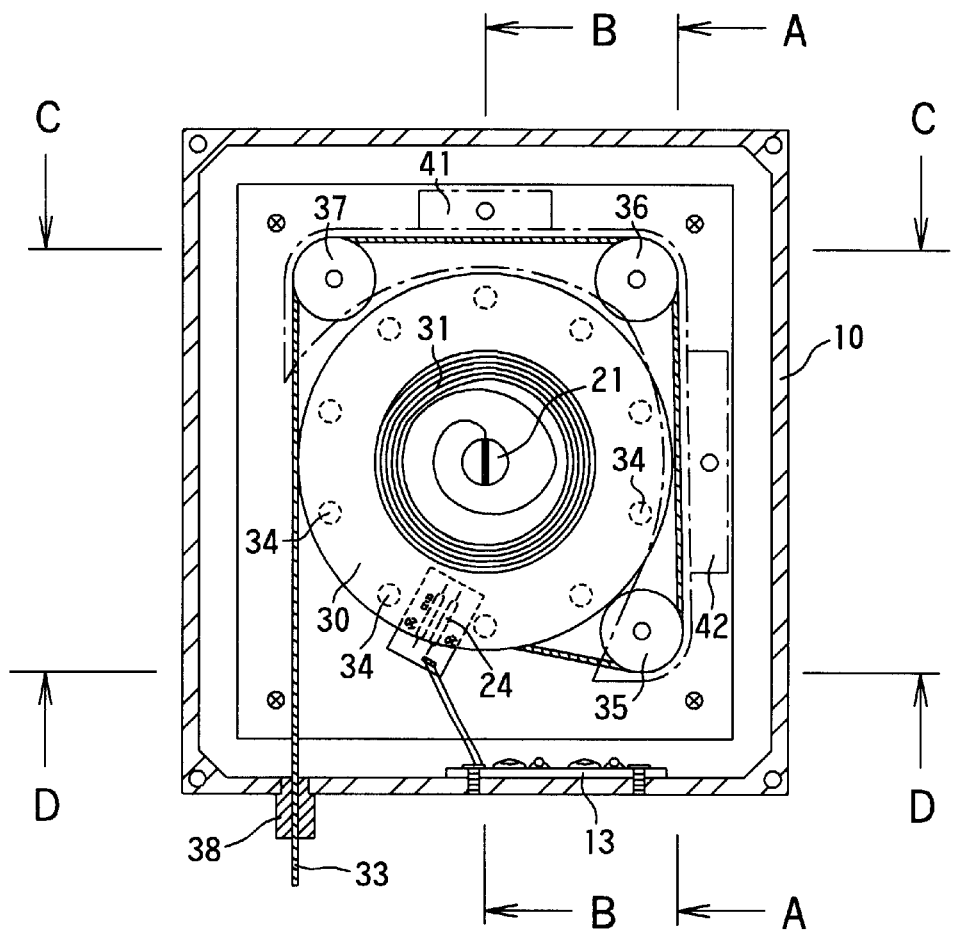
FIG. 3 is a front view of the stricture assembled in FIG. 2.
Figure 4:
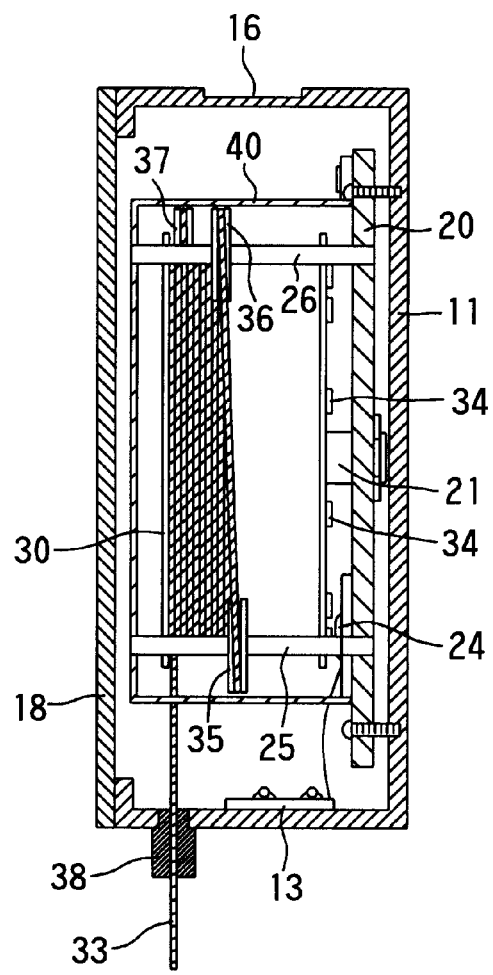
FIG. 4 is a sectional view, taken along line A—A in FIG. 3.

As shown in FIG. 1 to FIG. 7, a digital cable extension transducer of the present invention comprises a housing 10 with a side plate 11; a base plate 20 screwed to the side plate 11; a spool 30 supported by a shaft 21 on the base plate 20; a magnet-detecting element 24 on the base plate 20 for registering an angular movement of the spool 30 to a circuit board 13 mounted on the bottom plate of the housing 10; and three pulleys 35, 36, 37, surrounding the spool 30 for guiding the cable 33 to wind orderly on the spool.

The spool 30 carries a cable 33 and has an inner flange rim and a rear side, to which several magnets 34 are evenly spaced thereon. The cable 33 with one end attached to the spool 30 and the other end connected to the monitored object is provided for driving the spool 30 to rotate and generate signals for the displacement.

The bottom plate 12 of the housing 10 is mounted with a circuit board 13 and is provided with a hole 14 for a bushing 38 for facilitating smooth cable running. The cover 18 is integrally screwed to a front edge of the housing. The bushing 38 is used to facilitate smooth cable running through the bottom plate 12. A frame slot 16 is undercut on the outer wall of the housing 10 so as to secure the housing 10 on a detecting platform by a frame plate 17.

Figure 5:
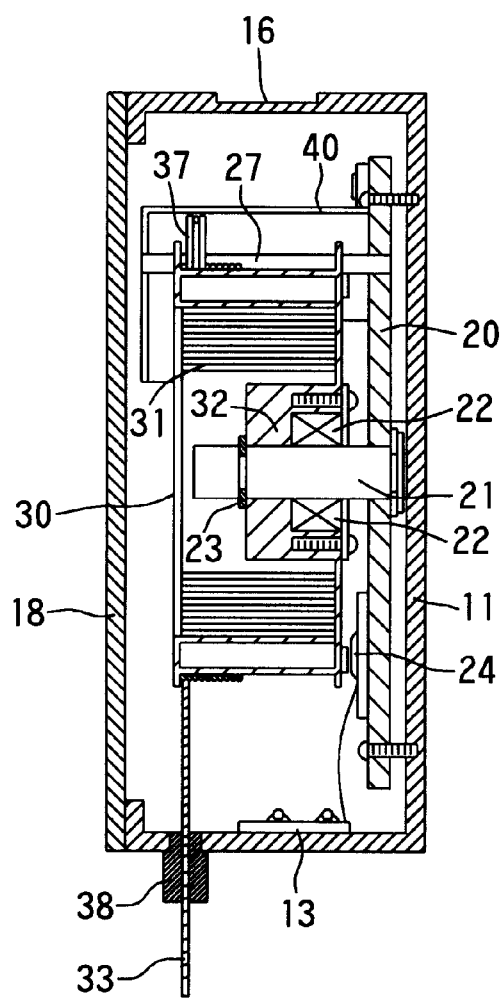
FIG. 5 is a sectional view, taken along line B—B in FIG. 3.
Figure 6:
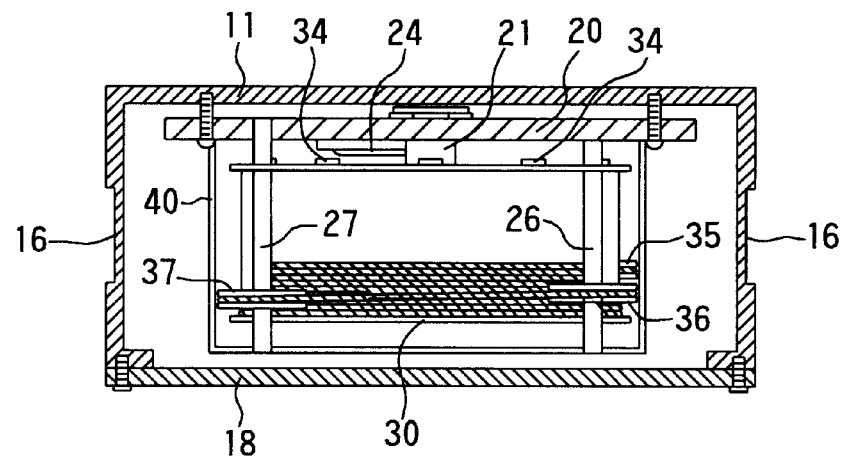
FIG. 6 is a sectional view, taken along line C—C in FIG. 3.
Figure 7:
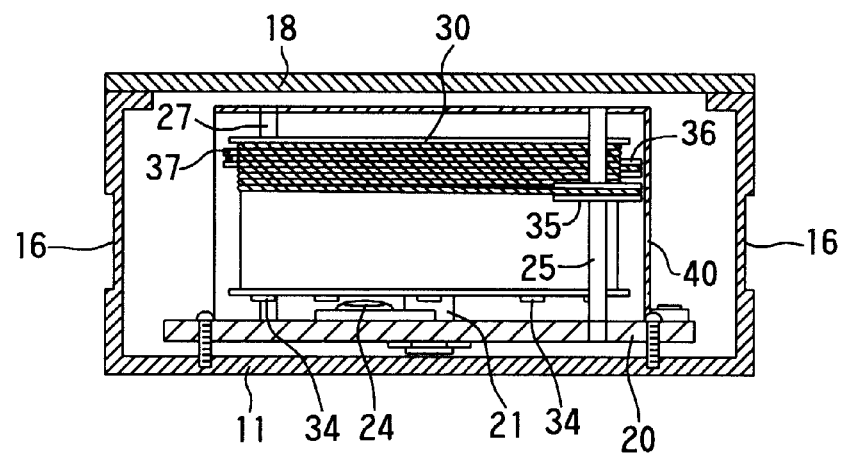
FIG. 7 is a sectional view, taken along line D—D in FIG. 3.

The base plate 20 is mounted on the side plate 11 of the housing 10. A spool 30 then is mounted with a shaft 21 at the center of the base plate 20. The shaft 21 includes a catch. A bearing 22 within the socket 32 of the inner flange of the spool is provided on the shaft 21 as shown in FIG. 5. The base plate 20 further comprises a magnet-detecting element 24, which is composed of reed switches, for sensing alternative pulse signals subject to the displacement of magnets 34 and dependent on the actual displacement of the monitored object.

The spool 30 is mounted on the center of the base plate 20, then a spiral spring 31 is mounted between an inner flange of the spool 30 and a catch of the shaft 21. Thus, the spool 30 simultaneously rotates with the pull and release of the cable 33, which is wound around the spool. Due to the magnet-detecting element 24, an alternative pulse signal is generated subject to the displacement of magnets 34 and dependent on the changing actual displacement of the monitored object attached to the extended cable 33, and thereafter processed by the circuit board 13. By the magnet-detecting element 24 on the base plate 20, the accurate displacement of the monitored object is detected and transmitted with digital type to the circuit board and displayed in LCD (not shown).

Three pulleys 35, 36 and 37 are mounted on three individual cylinders 25, 26 and 27 surrounding the spool 30 on the base plate 20 to constitute a cable guide assembly. The trenches around the pulleys facilitate smooth cable running. The cable 33 has one end attached to the spool 30 and the other end thereof connected to a pad with a hook 39 clasping the monitored object. The cable 33 is guided to extend or retract on the spool 30 through the cable guide assembly, and keeps orderly winding at its exact position to measure the accurate displacement.

As an L-shaped plate for shielding both the spool 30 and three pulleys, a baffle 40 is integrally affixed to the base plate 20 through flanges 41 and 42 extended from two edges of the baffle. Due to the three apertures 45, 46 and 47, the front edges of the baffle 40 are fixed to the ends of cylinders 25, 26 and 27 so that the cylinders are secured and the pulleys rotate by guiding the extended cable. With the distance between the inner wall of the baffle 40 and the outer walls of three pulleys smaller than the diameter of the cable, derailment of the extended cable is prevented from the pulleys when the extended cable releases at high acceleration or loosens by accident. Consequently, better operation performance and measure precision are obtained.
Operation For use on a gate the digital cable extension transducer of the present invention is mounted on the frame thereof, with the hook 39 on the cable 33 attached to the topside of the gate. Thus an upward and downward displacement of the gate causes the cable 33 to move simultaneously and allows the spool to rotate synchronously and register an angular movement of the spool. Accordingly, the accurate displacement of the top of the gate for gate operation is detected, automatically converted and displayed since magnet-detecting element 24 senses the alternative pulse signal subject to the magnet displacement dependent on the changing actual displacement of the monitored object attached to extended cable 33. Due to the pulleys 35, 36 and 37 surrounding the spool 30 on the base plate 20, the force applied to the spool 30 resulting from a pull on the cable 33 is attenuated, such that the cable 33 extends smoothly and winds orderly around the spool 30.

It will be understood that the foregoing description is a preferred embodiment of this invention, and that the invention is not limited to the specification shown. For example, various is materials may be used for the component parts or various components can be combined or interchanged. These and other modifications may be made in the design and arrangement of the elements without departing from the scope of the invention as expressed in the appended claims.

What is claimed is:

1. A digital cable extension transducer, comprising:
    a housing, comprising a side plate for screwing with a base plate, a bottom plate mounted with a circuit board, a hole for a bushing provided in the bottom plate, and a cover for a front edge of the housing;
    a spool, mounted on a shaft at the center of the base plate, said shaft comprising a catch, said spool comprising an outer flange and an inner flange, said inner flange having a plurality of magnets equally spaced thereon, the inner flange having a socket with a bearing therein, and a spiral spring being mounted between the inner flange and the catch of the shaft;
    three pulleys mounted on three individual cylinders surrounding the spool on the base plate to constitute a cable guide assembly, wherein the cable guide assembly guides the cable along grooves in the pulleys and assures orderly winding of the cable on the spool at an exact position to measure the displacement of an object to be monitored attached to the cable; and
    a baffle, being an L-shaped plate to provide for shielding both the spool and said three pulleys, and integrally affixed to the base plate, said baffle comprising a front edge for fixing to said three individual cylinders by respective apertures therein, wherein the distance between an inner wall of the baffle and outer walls of the pulleys is smaller than the diameter of the cable, thereby, to prevent the extended cable from derailing from the pulleys when releasing at high acceleration or loosening by accident.

2. A digital cable extension transducer according to claim 1, wherein the housing further comprises a frame slot undercut on its outer wall to be fixed on a detecting platform by a frame plate.

3. A digital cable extension transducer according to claim 1, wherein the base plate further comprises a magnet-detecting element sensing alternative pulse signals subject to displacement of the magnets and dependent on the actual displacement of the monitored object and transmitted in a digital signal to the circuit board.

4. A digital cable extension transducer according to claim 3, wherein the magnet-detecting element is composed of reed switches.

* * * * *